United States Patent Office 3,360,632
Patented Dec. 26, 1967

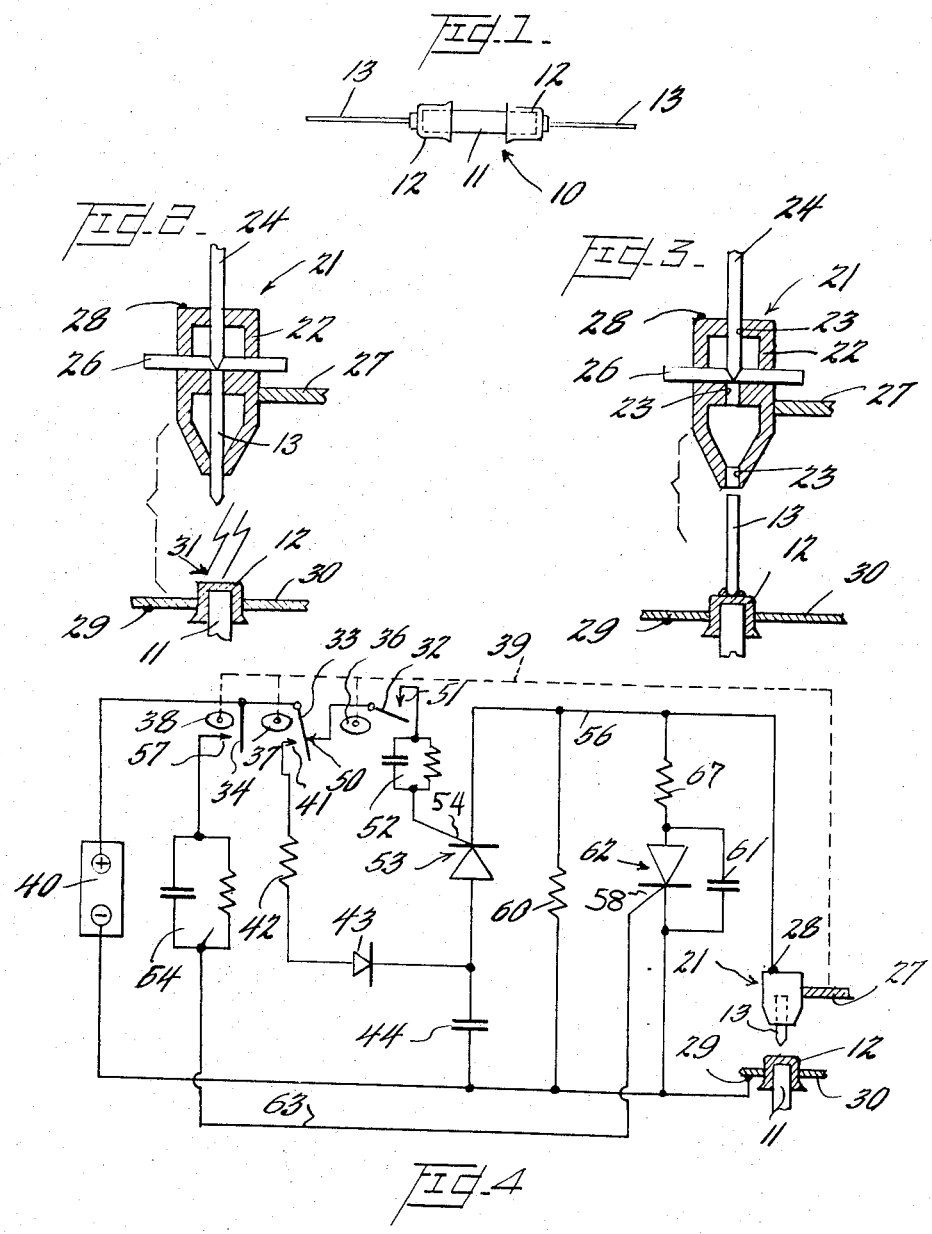

3,360,632
PERCUSSION WELDING CONTROL CIRCUIT
John C. Huffman, Winston-Salem, N.C., assignor to Western Electric Company, Incorporated, New York, N.Y., a corporation of New York
Filed Mar. 26, 1964, Ser. No. 354,930
10 Claims. (Cl. 219—113)

ABSTRACT OF THE DISCLOSURE

A percussive welding control circuit which is rendered effective by the relative advancement of the parts or components to be welded to switch welding energy from a storage circuit to discharge the welding energy between the parts when the parts reach a desired spacing and for dissipating welding energy when discharge fails to occur at the desired spacing.

---

This invention relates to a percussion welding control circuit and more particularly to a percussion welding control circuit having facilities for preventing damage to or destruction of the welding apparatus.

In the percussion welding of a pair of components, it is ideally desired that welding energy stored in an energy storage device begin to discharge at a desired spacing of the components as they are advanced at high speed toward each other. The initial discharge of energy ionizes the atmosphere in the air gap between the components to establish a low resistance path. The remainder of the energy then rapidly discharges in the air gap to produce heat which softens the surfaces of the components. The components continue to advance until impact fuses the components together in a unitary welded assembly.

Two major difficulties occur in the percussion welding of components. First, the welding energy may discharge while the components are percussively engaged. In this event, the energy is not dissipated across the air gap and the heat required for a good weld is not produced. Second, as in the case of a missing component, the welding energy may discharge after the period of the welding cycle when the components would normally make percussive engagement. In this event, the energy may be dissipated through and damage the welding apparatus.

This invention incorporates into a percussion welding control circuit facilities for harmlessly dissipating stored welding energy in the event discharge of energy fails to occur at the desired spacing of the components.

An object of the invention is to provide a new and improved percussion welding control circuit.

Another object is to provide a new and improved percussion welding control circuit having facilities for preventing damage to the welding apparatus.

Another object is to provide a percussion welding control circuit having facilities for preventing damage to the welding apparatus as a result of discharge of welding energy after the period of the welding cycle when the components would normally make percussive engagement.

Another object is to provide a percussion welding control circuit having facilities for switching stored welding energy to an air gap at a desired spacing of advancing components to be welded together and for harmlessly dissipating welding energy when discharge fails to occur at the desired spacing.

With these and other objects in view, a percussion welding control circuit illustrating certain features of the invention includes an energy storage circuit for storing welding energy. Facilities are provided for switching the energy storage circuit to permit discharge of the welding energy between a pair of advancing components when they reach the desired spacing and for dissipating welding energy when discharge fails to occur at the desired spacing.

Other objects and advantages of the invention will become apparent by reference to the following detailed specification and accompanying drawings, wherein:

FIG. 1 is a pictorial representation of a manufactured article having percussively welded components incorporated therein;

FIG. 2 is a cross sectional view of a chuck for percussively welding such components together;

FIG. 3 is a cross sectional view of the chuck of FIG. 2 after the operation thereof and showing components percussively welded together; and FIG. 4 is a schematic diagram of the percussion welder control circuit incorporating certain principles of the invention.

GENERAL DESCRIPTION

In FIG. 1, there is shown a manufactured article 10 which, by way of example, may be a carbon deposited resistor having a core 11 of resistive material. Core 11 has on each end, a pair of end caps 12 percussively welded to a pair of leads 13. It is to be understood that caps 12 and leads 13 are merely illustrative of a wide variety of components which may be percussively welded together employing a welding apparatus including the features of this invention.

In FIGS. 2 and 3, there is shown a chuck 21 which forms part of a welding apparatus (not shown) for percussively welding lead 13 and cap 12 together. Chuck 21 may be of the type invented by Messrs. F. H. Goode, L. A. Remley, Jr. and R. O. Terry, Jr., disclosed in Patent No. 3,239,646 which is assigned to the same assignee as this application. Chuck 21 includes a housing 22 provided with apertures 23 for receiving and directing a length of wire 24 or the like between a pair of cutting blades 26. A cam drive 27 is connected to chuck 21 and to the welding apparatus.

The percussion welding control circuit of this invention may be used in conjunction with chuck 21 and its associated welding apparatus. The percussion welding control circuit (FIG. 4) includes an energy storage circuit, an energization circuit, a welding circuit, a de-energization circuit, and a dissipation circuit. These circuits will be fully described later.

At the start of a percussion welding cycle, cutting blades 26 are operated to sever wire 24 and form lead 13. At this time, the energy storage circuit is charged with welding energy.

Cam drive 27 advances chuck 21 with lead 13 at a high speed toward cap 12. The cap is held in a fixed position by a suitable holding fixture 30. The percussion welding control circuit (FIG. 4) is connected to chuck 21 at point 28 and to holding fixture 30 at point 29. When the end of the advancing lead and the cap are separated by a desired spacing, the energization circuit is closed. This permits the welding circuit, which is coupled to the energy storage circuit, to strike an arc and discharge the welding energy between the lead and the cap. Chuck 21 continues to advance and percussively impacts the lead upon the cap to form a unitary welded assembly (FIG. 3).

In the event that the energy storage circuit does not discharge its welding energy at the desired spacing as chuck 21 advances, the welding circuit is effective to harmlessly dissipate the welding energy. At a time in the welding cycle after percussive engagement would normally be made, and the component holders are moved apart, the deenergization circuit conditions the dissipation circuit to harmlessly dissipate the welding energy.

Circuit description and operation

Referring to FIG. 4, the percussion welding control circuit includes switches 32, 33, and 34 which are operated by control cams 36, 37, and 38, respectively. These control cams are mounted on a common shaft 39 connected to cam drive 27 and the welding apparatus. Control cams 36, 37, and 38 are operated in coordination with the movement of chuck 21. Switches 32, 33, and 34 are shown in the normal positions that they occupy at the beginning of a percussion welding cycle. It is to be understood that control cams 36, 37, and 38, shaft 39, and their operation, are well known in the art and are for purposes of illustrating one embodiment of applicant's percussion welding control circuit.

The energy storage circuit is traced from the positive terminal of a D.C. potential source 40, through terminal 41 of switch 33, through resistor 42 and diode 43, to a welding energy storage capacitor 44 and back to the negative terminal of potential source 40. It will be understood that capacitor 44 may be any of a variety of devices capable of storing welding energy, for example a device operating on inductive principles.

At the start of a cycle of welding operation, chuck 21 and lead 13 begin to advance (downward in FIG. 2) toward cap 12. Switch 33 is closed by control cam 37 to terminal 41, thereby charging capacitor 44 with welding energy through the energy storage circuit.

When chuck 21 advances to the desired spacing for striking arc 31 (FIG. 2) between lead 13 and cap 12, switch 33 is closed by control cam 37 to terminal 50, and switch 32 is closed by control cam 36 to terminal 51. This action opens the energy storage circuit and completes the energization circuit. The energization circuit is traced from the positive terminal of potential source 40 through switches 33 and 32, through an RC network 52, to the gate 54 of a first controlled rectifier 53.

First controlled rectifier 53 is normally nonconductive since its gate 54 is connected to normally open-circuited terminal 51. Therefore, first controlled rectifier 53 precludes capacitor 44 from discharging before closure of switch 32 to terminal 51. First controlled rectifier 53 may, for example, be a 2N683 semiconductor device which is manufactured by the Transistron Company and the General Electric Company, among others. The 2N683 type rectifier is rated at 75 $amp^2$ seconds heat dissipation for a time less than or equal to 8 milliseconds. It will be understood that other types of commercially available controlled rectifiers may be employed as the first controlled rectifier 53 in a particular application, since its selection as well as a second rectifier 62 in the dissipation circuit described below, is dependent upon the desired amplitude and duration of the welding energy pulse.

Completion of the energization circuit places a positive potential on gate 54 of first controlled rectifier 53. RC network 52 then develops and applies a positive pulse of a predetermined magnitude to gate 54 of first controlled rectifier 53. This pulse switches first controlled rectifier 53 to the conductive state and permits discharge of capacitor 44 through the welding circuit and between the lead and cap. The welding circuit is traced from capacitor 44, through first controlled rectifier 53, over conductor 56, over lead 13, across the air gap, through cap 12, and back to capacitor 44.

At the desired spacing, the initial discharge of the welding energy stored in capacitor 44 ionizes the air gap between the cap and lead to establish a low resistance path. This action permits rapid discharge of the remaining welding energy which produces heat to soften the end surfaces of lead 13 and cap 12. Chuck 21 continues to advance and percussively impacts the lead upon the cap to form a unitary welded assembly (FIG. 3).

A resistor 60 is connected across first controlled rectifier 53 and capacitor 44 to complete a circuit which provides a minimum flow of current to maintain the first controlled rectifier in the conductive state prior to the initiation of arc 31 (FIG. 2). A capacitor 61 is connected across a second controlled rectifier 62 for preventing this rectifier from switching to the conductive state as a result of the rapid rate of increase in its anode voltage at the time that RC network 52 applies a positive pulse to the gate 54 of first controlled rectifier 53. Second controlled rectifier 62 is substantially identical to the first controlled rectifier 53.

As chuck 21 begins to return towards its initial position (FIG. 2), switch 34 is closed by control cam 38 to a terminal 57 to complete the de-energization circuit. It is during this separation period of the welding cycle, when the chuck 21 is withdrawn by the camming means (releasing the welded lead, or retaining an unwelded lead), that an undesired discharge of the welding energy would damage the welding mechanism. The de-energization circuit is traced from the gate 58 of second control rectifier 62, over conductor 63, through RC network 64, through switch 34, to the positive terminal of potential source 40.

Second controlled rectifier 62 is normally non-conductive since its gate 58 is connected to normally open-circuited terminal 57. Completion of the de-energization circuit places a positive potential on the gate 58 of second controlled rectifier 62. RC network 64 then develops and applies a positive pulse of a predetermined magnitude to gate 58. This pulse switches second controlled rectifier 62 to the conductive state to complete the dissipation circuit.

The dissipation circuit is traced from capacitor 44, through first controlled rectifier 53, over conductor 56, through second controlled rectifier 62, and back to capacitor 44. The energization circuit has been completed to render first controlled rectifier 53 conductive, and the de-energization circuit has been completed to render second controlled rectifier 62 conductive. The dissipation circuit is now completed by the switching of second controlled rectifier 62 to the conductive state. The controlled rectifiers 53 and 62, because of their heat dissipation characteristics, and resistor 67, dissipate the welding energy remaining in capacitor 44 which did not discharge across the air gap. Residual energy may be present due to absence of a lead in the chuck or where there is inadequate contact between the components.

At the end of the return movement of chuck 21 to its initial position (FIG. 2), switches 32 and 34 are opened by control cams 36 and 38 respectively to their initial open positions. Any charge which had collected on the capacitors of RC networks 52 and 64 is dissipated by their respective parallel resistors. Thus, the controlled rectifiers 53 and 62 are rendered non-conductive. Switch 33 remains closed to terminal 50. This action completes a normal percussion welding cycle.

Although applicant's control circuit has been described with respect to the percussion welding of a lead to a cap, it will be apparent to one skilled in this art that the invention can easily be modified for use with other apparatus for percussively welding any two components together. Furthermore, it is inconsequential whether both components are advanced toward each other or one component remains stationary while the other is advanced.

It is to be understood that the above-described embodiment is illustrative of the principles of the invention and many other alternatives could be devised without departing from the scope of the invention.

What is claimed is:

1. A control circuit for a percussion welding apparatus having facilities for relatively advancing a pair of components into percussive engagement, comprising
    a storage circuit for storing welding energy, and
    means rendered effective by the advancement of the components for switching the storage circuit to discharge the welding energy between the advancing components at a desired spacing and for dissipating welding energy when discharge fails to occur at the desired spacing.

2. A control circuit for a percussion welding apparatus having facilities for advancing a pair of components into percussive engagement, comprising
  a storage circuit for storing welding energy,
  an energization circuit, and
  means rendered effective by the energization circuit for switching the storage circuit to discharge the welding energy between the advancing pair of components at a desired spacing and for dissipating welding energy when discharge fails to occur at the desired spacing.

3. A control circuit for a percussion welding apparatus having facilities for advancing a pair of components into percussive engagement, comprising
  a storage circuit for storing welding energy,
  first means rendered effective by the advancment of the components for switching the storage circuit to discharge welding energy between the advancing components at a desired spacing, and
  second means rendered effective upon failure of the welding energy to discharge at the desired spacing for dissipating welding energy remaining in the storage circuit.

4. A control circuit for a percussion welding apparatus having reciprocatable facilities for holding and advancing a pair of components into percussive engagement, and means for reciprocating the facilities, comprising
  a storage circuit having means for storing welding energy,
  means for normally precluding the storage circuit from discharging the energy from the storing means,
  a welding circuit, coupled to the welding energy storage circuit and the precluding means, arranged for connection to the pair of components,
  an energization circuit controlled by the facilities reciprocating means, rendered effective at a desired spacing of the advancing components for switching the precluding means to permit discharge of the welding energy from the storing means through the welding circuit and between the components, and
  means responsive to subsequent withdrawal of the advancing facilities for dissipating welding energy when switching does not occur at the desired spacing.

5. A control circuit for a percussion welding apparatus having reciprocatable facilities for advancing a pair of components into percussive engagement, comprising
  a welding circuit arranged for connection to the components,
  a welding energy storage circuit coupled to the welding circuit,
  an energization circuit coupled to the welding circuit for switching the storage circuit at a desired spacing of the advancing components to discharge the welding energy through the welding circuit and between the components, and
  a dissipation circuit coupled to the storage circuit responsive to retraction of the component advancing facilities after intended percussive engagement for dissipating welding energy remaining in the storage circuit.

6. A control circuit for a percussion welding apparatus having reciprocatable component holding facilities for advancing a pair of components into percussive engagement, and means for reciprocating the facilities, comprising
  a welding circuit arranged for connection to the components,
  a welding energy storage circuit coupled to the welding circuit and normally precluded from discharge by the welding circuit,
  an energization circuit coupled to the welding circuit for switching the storage circuit at a desired spacing of the advancing components to discharge welding energy through the welding circuit and between the components,
  a dissipation circuit coupled to the storage circuit, and
  a de-energization circuit, coupled to the dissipation circuit and rendered effective by the reciprocating means after intended percussive engagement, for conditioning the dissipation circuit to permit dissipation of welding energy remaining in the storage circuit.

7. A control circuit for a percussion welding apparatus having reciprocatable facilities for advancing a pair of components into percussive engagement, and means for reciprocating the facilities, comprising
  a welding circuit arranged for connection to the components,
  a welding energy storage circuit coupled to the welding circuit,
  a first controlled rectifier coupled to the storage and welding circuits and rendered effective by the advancement of the components to a desired spacing, for switching the storage circuit to permit discharge of welding energy across the components, and
  a second controlled rectifier coupled to the first controlled rectifier to complete a dissipation circuit for dissipating welding energy remaining in the storage circuit after intended percussive engagement when the reciprocating means starts to retract.

8. A control circuit for a percussion welding apparatus having reciprocatable facilities for holding and advancing a pair of components into percussive engagement and then, during a separation period of the welding cycle, after the intended percussive engagement period, for withdrawing the facilities, comprising
  a welding circuit arranged for connection to components,
  a welding energy storage circuit coupled to the welding circuit,
  an energization circuit completed at a predetermined spacing of the advancing components,
  a de-energization circuit completed upon the separation of the components after intended percussive engagement,
  a first controlled rectifier included in the welding circuit and rendered effective by the completion of the energization circuit, for switching the storage circuit to discharge welding energy through the welding circuit and between the components, and
  a second controlled rectifier coupled to the first controlled rectifier to complete a dissipation circuit for dissipating welding energy remaining in the storage circuit during the separation period of the welding cycle, the second controlled rectifier being rendered conductive by the de-energization circuit.

9. A control circuit for a percussion welding apparatus having reciprocatable facilities for holding and advancing a pair of components into percussive engagement as in claim 8, comprising
  a capacitor, arranged for connection to the pair of components, for storing welding energy,
  a storage circuit for charging the capacitor,
  a first controlled rectifier connected to the capacitor for normally precluding discharge of the capacitor,
  an energization circuit, connected to the first controlled rectifier and rendered effective by the advancing components reaching a critical spacing, for conditioning the first controlled rectifier to permit the capacitor to discharge between the advancing components, and
  a second controlled rectifier, coupled to the first controlled rectifier to complete a dissipation circuit for dissipating welding energy remaining in the capacitor upon withdrawal of the holding facilities during the separation period of the welding cycle.

10. A control circuit for percussion welding apparatus having reciprocatable facilities for holding and advancing a pair of components into percussive engagement as in claim 8, comprising
  a capacitor, a storage circuit connected to the capacitor for charging the capacitor, a first controlled rectifier connected in series with the capacitor, the capacitor and first controlled rectifier being arranged for connection to the components, a second controlled rectifier arranged for connection to the components, an energization circuit connected to the first controlled rectifier for rendering the first controlled rectifier conductive to permit discharge of the capacitor at a critical spacing of the advancing components, and a de-energization circuit, connected to the second controlled rectifier for rendering the second controlled rectifier conductive during the separation period of the welding cycle, the first and second controlled rectifiers completing a circuit with the capacitor to dissipate welding energy remaining on the capacitor.

References Cited

UNITED STATES PATENTS

| | | | |
|---|---|---|---|
| 2,315,093 | 3/1943 | Languepin | 219—113 X |
| 2,375,229 | 5/1945 | Klemperer | 219—113 X |
| 2,419,749 | 4/1947 | Weinhardt et al. | 219—96 X |
| 2,459,153 | 1/1949 | England | 219—113 |
| 2,816,209 | 12/1957 | Blackmer | 219—95 |
| 3,217,207 | 11/1965 | Webb | 317—31 X |

RICHARD M. WOOD, *Primary Examiner.*

B. A. STEIN, *Assistant Examiner.*